United States Patent
Kistrup et al.

Patent Number: 5,789,097
Date of Patent: Aug. 4, 1998

[54] GAS-TIGHT MAINTENANCE-FREE CELL OR BATTERY

[75] Inventors: Holger Kistrup, Esslingen; Otwin Imhof, Nuertingen, both of Germany

[73] Assignee: Deutsche Automobilgesellschaft mbH, Brunswick, Germany

[21] Appl. No.: 766,046

[22] Filed: Dec. 16, 1996

Related U.S. Application Data

[63] Continuation of Ser. No. 247,693, May 23, 1994, abandoned.

[30] Foreign Application Priority Data

May 21, 1993 [DE] Germany ............. 43 16 990.2

[51] Int. Cl.$^6$ ...................... H01M 10/34
[52] U.S. Cl. ...................... 429/59; 429/101
[58] Field of Search ............. 429/59, 101, 223, 429/196

[56] References Cited

U.S. PATENT DOCUMENTS

| | | |
|---|---|---|
| 2,941,022 | 6/1960 | Mandel. |
| 3,108,908 | 10/1963 | Krebs. |
| 3,207,631 | 9/1965 | Zaromb. |
| 4,621,034 | 11/1986 | Kanda et al. ............. 429/59 |
| 5,043,234 | 8/1991 | Tomanlschger et al. ........ 429/59 |
| 5,122,426 | 6/1992 | Simon et al. ............. 429/59 |

FOREIGN PATENT DOCUMENTS

| | | |
|---|---|---|
| 0301647 | 2/1989 | European Pat. Off. . |
| 42 18 381 C1 | 6/1992 | Germany . |
| 43 11 313 C1 | 4/1993 | Germany . |
| 60-062 068 | 4/1985 | Japan . |
| 0970638 | 9/1959 | United Kingdom . |
| 970638 | 9/1964 | United Kingdom . |
| 1288236 | 9/1972 | United Kingdom . |
| 2029080 | 8/1978 | United Kingdom . |
| 2029080 | 3/1980 | United Kingdom . |

*Primary Examiner*—M. Nuzzolillo
*Attorney, Agent, or Firm*—Evenson, McKeown, Edwards & Lenahan, P.L.L.C.

[57] ABSTRACT

A gas-tight maintenance-free cell or battery comprises positive nickel oxide electrodes having a fibrous structure, gas-impermeable separators, a fixed alkaline electrolyte, negative metal electrodes having a fibrous structure and a higher charging and discharging capacity than in the case of the positive electrodes, and electroconductive gas diffusion compartments. The cell operating according to the oxygen cycle. The metallized fibrous-structure electrode frameworks of the negative electrodes are filled with the active material only in certain zones. Those zones of the fibrous-structure electrode frameworks of the negative electrode which are not filled with the active material, serve as gas diffusion zones, integrated into the frameworks, for the oxygen to be discharged at the negative electrode.

14 Claims, 1 Drawing Sheet

GAS-TIGHT MAINTENANCE-FREE CELL OR BATTERY

This is a continuation of application Ser. No. 08/247,693, filed May 23, 1994, now abandoned.

BACKGROUND AND SUMMARY OF THE INVENTION

The present invention relates to a gas-tight maintenance-free cell or battery and, more particularly, to a cell or battery comprising positive nickel oxide electrodes having a fibrous structure, with gas-impermeable separators, a fixed alkaline electrolyte, negative metal electrodes having a fibrous structure and a higher charging and discharging capacity than in the case of the positive electrodes, and electroconductive gas diffusion compartments, with the cell operating according to the oxygen cycle.

Gas-tight alkaline accumulators have been used industrially for a long time. One such accumulator is shown in DE-A-2,902,262. The negative electrodes of such alkaline current accumulators may contain cadmium, hydrogen, zinc or, alternatively, cobalt or iron as the active material. In the case of corresponding cells containing positive nickel oxide electrodes, it is advisable, for many applications involving maintenance-free and gas-tight operation, to make the negative electrode larger than required in terms of the given storage capacity of the positive electrode. In practical charging operation this means that, when the cell is being fully charged, oxygen is already being generated at times at the positive electrode, while on the negative electrode, e.g., $Cd^{2+}$ is still being reduced to $Cd^{0}$.

The oxygen being generated at the positive electrode can then, via various routes (namely through a gas-permeable separator or via a gas-filled space, the electroconductive macroporous gas diffusion bodies through which free flow is possible) reach the negative electrode during charging so as to be reduced again. This mode of operation means that there is performed, at the negative electrodes, the normal function of a storage electrode (retaining or permanent fixing of the active material and current supply and collection). At the electroconductive gas diffusion body assigned to the negative electrode, the oxygen reduction of the oxygen is generated at-the positive electrode as the cell is being fully charged.

Various approaches have been tried in the past to solve this problem. All these approaches have in common that these different functions are entrusted to different components which, with respect to their make-up in terms of porosity or spatial arrangement, are clearly distinct. Thus, for example, according to German Patent No. 975,903, the negative electrode of an alkaline accumulator which is permanently sealed in a gas-tight manner, is subdivided into three spatially separated zones, namely into two components containing active material (current conduction and fixing of active material) and a space situated therebetween, designed to be wholly or partially free of electrolyte. The interspace containing little or no electrolyte performs the function of bringing up the oxygen to be reduced which, according to the description of this patent, is effected by interposing a further component, namely a spacer made of conductive or non-conductive material.

German Patent No. 1,013,341 requires that the negative electrode is provided with an electroconductively bonded overlay whose porosity and electrochemical inertness is subject to certain conditions in order to successfully manage the oxygen reduction at the negative electrode. The metallically conductive macroporous overlay may be applied unilaterally or bilaterally onto the sintered foil electrode or to an extremely thin strip electrode. According to this patent, the metal overlays may also have a multilayered structure.

German Patent No. 2,907,262 also suggests the distribution of the three functions which are performed by the negative electrodes in gas-tight operation over a total of three components per negative electrode, namely a porous metallically conductive gas diffusion body which is surrounded on both sides by negative electrodes or electrode halves.

In DE-A-1,596,223 there is incorporated, in addition to a negative electrode, a porous layer which consists of an electroconductive porous metal body whose metal surface has additionally been made hydrophobic by a conventional technique, namely by an application of polystyrene or Teflon. Again at least two components, namely the negative electrode and the porous sandwich, which is metallically conductive but has been made hydrophobic, are specified as a possible solution, in order to reduce to an acceptable degree, by increasing the oxygen consumption rate, the charging time of a sealed accumulator containing alkaline electrolyte.

U.S. Pat. No. 2,941,022 suggests that a spongy metal structure be brought into contact with the cell wall and the cadmium electrode, it being necessary to design the spongy metal structure as a component separate from the negative electrode.

Conventional approaches to the problem can be summarized by stating that provision is made for always at least two, usually three, separate components for the individual reactions, with redox reaction of the metallic negative electrode and oxygen consumption, at the negative electrode, of the oxygen being generated at the positive electrode during charging, which proceed at a positive nickel oxide electrode in a maintenance-free alkaline accumulator which can be operated in a gas-tight manner.

On one hand, the use of these known gas diffusion bodies, whose manufacture is at times very laborious and complicated, in conjunction with a negative electrode of an alkaline accumulator may give technically satisfactory results in terms of the chargeability of a gas-tight accumulator. In terms of practical manufacturing, on the other hand, they are involved and therefore, accordingly, also expensive. If the cell components are packed very tightly, correspondingly exacting demands must be made in terms of the dimensional accuracy of the individual components. This also means that appropriate tests have to be carried out during the fabrication of the individual components. In addition, as explained in detail in the literature on the prior art, the need of accurately predefining the electrolyte balance of the cell and consequently also of aiming for the metallically conductive porous framework body as far as possible, for the purpose of oxygen flow against the negative electrode on one side, to be substantially free of electrolyte, for example by hydrophobization, involves the risk of the gas diffusion body, owing to inadequate hydrophobization, nevertheless being at least partially filled with the electrolyte or, in the case of overcomplete hydrophobization of the metallic diffusion body, the electrically desirable conductive contact on the side of the negative electrode is, at least in part, not achieved uniformly area-wise.

An object of the present invention is to provide an alkaline cell, which is operated in a gas-tight manner, having positive nickel oxide electrodes with a fibrous structure, negative metal electrodes having a fibrous structure and with a higher charging and discharging capacity than in the case of the positive electrodes, and electroconductive gas diffusion compartments, the cell operating according to the oxygen cycle, in which the number of components in the cell is reduced. This, in turn, reduces the test effort required for the components during manufacture of the cells, a further objective being that the above-mentioned drawbacks in the operation of the cell should no longer occur.

The foregoing object has been achieved according to the present invention by providing that the metallized fibrous-structure frameworks of the negative electrodes are filled with the active material only in certain zones, and those zones of the metallized fibrous structure frameworks of the negative electrodes which are not filled with the active material, constitute gas diffusion compartments, integrated into said negative electrodes, for the oxygen to be discharged at the negative electrodes.

According to the present invention, only certain zones of the metallized fibrous-structure framework of the negative electrodes are filled with the active material. Those zones of the metallized fibrous-structure framework which are not filled with the active material serve as gas diffusion compartments for the oxygen flowing from the positive to the negative electrode, where it is discharged, to flow through. In the initial state, the fibrous-structure framework has a uniform pore distribution with approximately equal pore diameter. As a result of certain zones of the fibrous-structure framework of the negative electrode being filled with the active material, zones having a lower pore diameter are formed. As the electrolyte is added in a controlled manner, these pores, owing to the higher capillary force obtaining there, preferentially fill with the electrolyte. As the pores of those zones of the fibrous-structure framework of the negative electrode, which are not impregnated with the active material, do not, or only to a very minor extent, become saturated with the electrolyte during the addition of the latter, they are accordingly open for perfusion with the oxygen to be reduced which is generated at the positive electrode, as the cell is being fully charged, and flows against those zones of the negative electrode which are filled with the active material.

Various filling techniques for fibrous-structure frameworks are known. For the purpose of zonal filling of fibrous-structure electrode frameworks with active material, pressing the active material into the framework by means of a press ram, according to German Patent No. 4,103,546, or rolling in of the active material into the framework according to German Patent No. 4,040,017, are particularly suitable.

Zonal impregnation of the framework for the negative electrode with an integrated gas diffusion compartment can be carried out such that the active material is pressed or rolled into the framework structure from one side only. In so doing, the volume of the active-material paste to be introduced into the framework structure is made smaller than the free pore volume of the framework structure prior to the filling process. Thus a fibrous-structure electrode framework is obtained which, seen across its thickness, contains two zones, namely one zone which is filled with active material and one zone which does not have a filling of active material and which is available for the transport of oxygen. In another procedure, the fibrous-structure electrode framework, after application of the active-material paste, is filled therewith on both sides by pressing in or rolling in. The amount of the active-material paste to be introduced in this case is again smaller than the free pore volume of the framework structure, so that an integrated gas diffusion compartment is produced between two framework zones filled with active material. In practice, the amount of the active-material paste to be introduced into the framework is usually predefined in such a way that, based on the total volume of the framework, the volume of the gas diffusion compartment integrated in the framework is at least 20%, preferably from 30 to 40%.

In a currently preferred embodiment, in the case of the negative electrode, the metallized surface of the gas diffusion compartment integrated in the electrode is hydrophobized.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
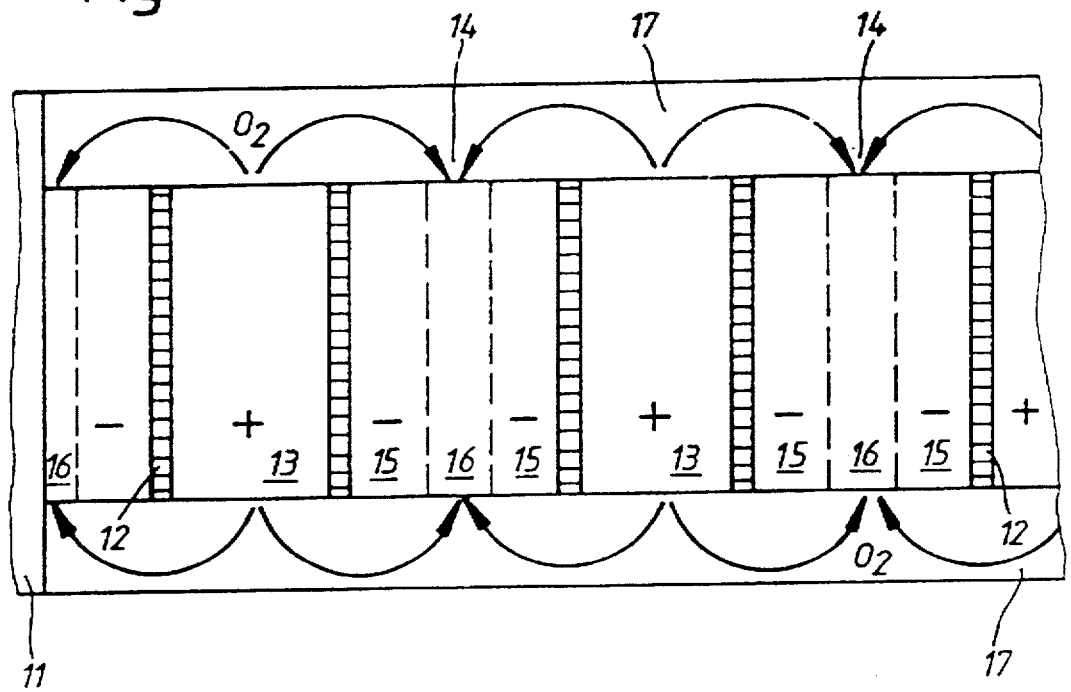
FIG. 1 is a sectional view through a cell casing with the cell stack arranged therein, and a schematic representation of the course of the oxygen flow in the cell casing.

In FIG. 1, an insulating wall 11 is provided for a cell stack, and separators 12 surround both sides of positive nickel oxide electrodes 13. A negative electrode 14 consists of a metallized fibrous-structure framework. Each negative electrode 14 has two sections 15 which face the positive electrodes 13 and are filled with active material and, arranged in the center thereof, a gas diffusion compartment 16 which is essentially free of active material. A gas-filled space 17 is located above and below the electrodes 13, 14. In the space 17, oxygen escaping from the positive electrode 13 during operation reaches the gas diffusion compartment 16, integrated in the negative electrode 14, where it is reduced. The current collector lugs of conventional construction connected to the electrodes in a known way are not shown for ease of understanding.

Figure 2:
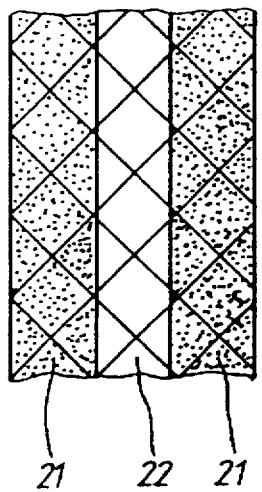
FIG. 2 is a partial, cross-sectional view of a negative electrode with the integrated gas diffusion compartment.

In FIG. 2, two zones 21 of the negative electrode are filled with the active material, and a gas diffusion compartment 22 is integrated between the two zones 21.

Figure 3:
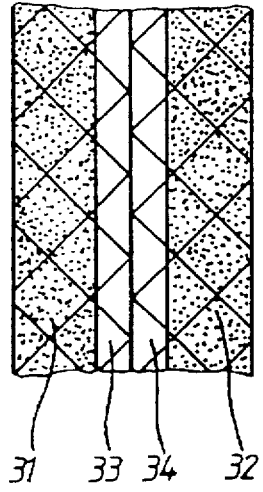
FIG. 3 is a partial, cross-sectional view of two negative electrodes arranged symmetrically with respect to one another, with two gas diffusion compartments arranged unilaterally and connected to the electrodes.

In FIG. 3, the zones 31, 32, filled with active material, of the two negative electrodes are arranged symmetrically with respect to one another. Adjoining the electrode 31 is the gas diffusion compartment 33, and adjoining the electrode 32 is the gas diffusion compartment 34, which are both essentially free of active material and are adjacent to one another.

Figure 4:
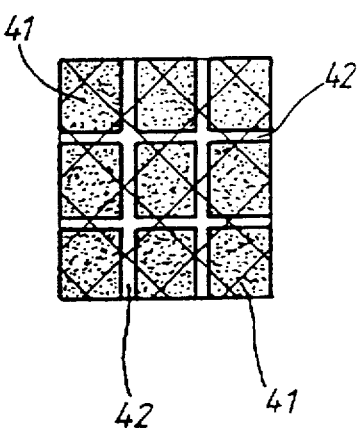
FIG. 4 is a partial, cross-sectional view of a negative electrode which is filled with active material only in sections.

In FIG. 4, numeral 41 designates faces coated with active material at a negative electrode. Ducts 42 pass between these faces 41 and are essentially free of active material. By way of the ducts 42, the oxygen to be reduced also reaches, via the end and lateral faces of the electrode framework filled with active material, the integrated gas diffusion compartment according to FIGS. 2 and 3.

EXAMPLE

In the case of a 40 Ah cell having positive nickel oxide electrodes and negative cadmium electrodes, four positive electrodes were fitted, and, for the purpose of material and charge conversion of the negative active material and for the recombination of the oxygen, a further five components, namely five negative electrodes. Hitherto, according to the prior art, a total of thirteen further components was necessary, namely eight negative electrodes and five recombination frameworks. Thus, the saving of 61% of the previously required components has been achieved. Specifically, four positive electrodes having a thickness of 2.3 mm and a filling of 42 g of dry positive active material were fitted. The negative electrodes employed constituted three fibrous-structure plates having a thickness of approximately 3.2 mm which were filled, on both sides, to a thickness of approximately 1.1 mm with about 65 g of negative active material (dry weight). In addition there were two edge plates each having a thickness of approximately 2 mm which were filled area-wise on one side, again to a thickness of 1.1 mm, with 32.5 g of dry negative active material.

The introduction of the negative active material was effected by a predefined amount of active-material paste being applied unilaterally, or else bilaterally, to the electrode framework, being distributed uniformly over the entire lateral faces of the electrode plates, and by pressing the paste zonally into the electrode framework by a pressing process. After completion of the pressing-in process, the electrode frameworks impregnated only zonally with the active material were dried.

The advantage achieved with the present invention is, in particular, that the number of the components to be fitted during manufacture of the cell can be reduced. At the same time, this results in a reduced test requirement for the components to be fitted into the cell and in reduced stock-keeping of the components required for the cell. It also obviates the assembly, for the purpose of achieving good electrical contact between the recombination element and the negative electrode, of the cell stack under high pressure. In addition, improved heat dissipation is obtained.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A sealed maintenance-free, oxygen-cycle cell, comprising positive nickel oxide electrodes having a fibrous structure filled with an active nickel oxide material, gas-impermeable separators, a liquid alkaline electrolyte, negative metal electrodes having a metallized fibrous structure impregnatable by the liquid alkaline electrolyte and a higher charging and discharging capacity than the positive electrodes, and an electroconductive gas diffusion compartment, wherein the negative electrodes are filled with active material only in selected portions of a metallized fibrous structure framework thereof, and other portions of the metallized fibrous structure framework of each of the negative electrodes which are not filled with the active material constitute the gas diffusion compartments integrated into said negative electrodes where oxygen is dischargeable.

2. The cell according to claim 1, wherein each of the negative electrodes is arranged between two of the separators, each of which is in contact with positive electrodes, the selected portions of each of the so-arranged negative electrodes being adjacent to the separators and a middle portion of the negative electrode being devoid of the active material.

3. The cell according to claim 1, wherein two of the negative electrodes are arranged adjacent and symmetrically with respect to one another in the cell stack and each has the gas diffusion compartment, the active material-filled zones of the two negative electrodes face the separators, and the two gas diffusion compartments at that side of the negative electrodes which face away from the separators, are adjacent one another.

4. The cell according to claim 1, wherein at least one of the negative electrodes in the interior of the cell stack has an integrated gas diffusion compartment and consists of laterally adjacent zones, one of the zones being adjacent the separator and filled with the active material and another of the zones facing away from the separator and being devoid of the active material.

5. The cell according to claim 1, wherein the negative electrodes are arranged in the cell stack with sections facing the separators, each of which is adjacent one of the positive electrodes, and a gas diffusion compartment is arranged between the sections.

6. The cell according to claim 1, wherein a metallized surface of the gas diffusion compartment is integrated in the negative electrodes and is hydrophobized.

7. The cell according to claim 1, wherein a volume of the gas diffusion compartment of each of two of the negative electrodes of the cell stack with the gas diffusion compartment integrated therein is smaller than a volume of the gas diffusion compartment of the negative electrodes with the gas diffusion compartment integrated therein in an interior portion of the cell stack.

8. The cell according to claim 1, wherein the metallized fibrous-structure framework of the negative electrodes is filled with the active material in surface sections with ducts formed therebetween to function as gas diffusion zones.

9. The cell according to claim 8, wherein the ducts formed in the negative electrodes between the surface sections include open ducts which lead to end faces of the electrode are open.

10. The cell according to claim 1, wherein the metallized fibrous-structure framework is one of chemically metallized and electrodeposited on a bonded plastic fiber web or a plastic needle felt.

11. The cell according to claim 1, wherein the fibrous-structure framework of the metallized fibrous structure in the negative electrode is one of a non-woven and a needle felt having a nominal thickness of from 0.3 to 5.0 mm, a porosity in the untreated state of from 50 to 98%, a mass per unit area of from 50 to 800 g/m$^2$ and bonded fibers having a staple length of from 15 to 80 mm.

12. The cell according to claim 1, wherein the the active material filling the fibrous-structure framework of the negative electrodes is an oxide or hydroxide selected from the group consisting of cadmium, cobalt, zinc and iron.

13. The cell according to claim 1, wherein the active material in the fibrous-structure framework of the negative electrodes is an active material paste which in a non-dried state has a yield strength range of from 5 to 250 Pa and a plastic viscosity of from 0.05 to 3.5 Pa.s.

14. The cell according to claim 1, wherein the active material for the negative electrodes contains from 15 to 35 volume of cadmium oxide, 7 volume % of cadmium and 1 volume % of nickel hydroxide.

* * * * *